United States Patent [19]

Ashida et al.

[11] Patent Number: 5,801,788

[45] Date of Patent: Sep. 1, 1998

[54] VIDEO DISPLAY APPARATUS FOR DISPLAYING PLURAL IMAGES SIMULTANEOUSLY ON A SCREEN

[75] Inventors: Eiichi Ashida; Kinya Kanno, both of Suita; Shoichi Goto, Osaka, all of Japan

[73] Assignee: Matsushita Electric Industrial Co., Ltd., Osaka, Japan

[21] Appl. No.: 709,551

[22] Filed: Sep. 6, 1996

[30] Foreign Application Priority Data

Sep. 8, 1995 [JP] Japan ................................. 7-231143

[51] Int. Cl.[6] ........................................................ H04N 5/45
[52] U.S. Cl. ........................ 348/588; 348/598; 348/565; 348/567
[58] Field of Search ................................... 348/564, 565, 348/566, 567, 568, 588, 584, 598, 599; H04N 5/45

[56] References Cited

U.S. PATENT DOCUMENTS 5,481,315  1/1996  Matsunaga .............................. 348/565

FOREIGN PATENT DOCUMENTS

59-37913   9/1984   Japan .
62-269482  11/1987  Japan .
3-18183    1/1991   Japan .

Primary Examiner—Sherrie Hsia
Attorney, Agent, or Firm—Ratner & Prestia

[57] ABSTRACT

A video display apparatus comprising a memory of fields for plural images, a device for judging whether even-number field or odd-number field, and a frame synchronizing device for reading and selecting fields, in which, if the input has one type of field only, these plural images are displayed simultaneously while keeping correct interlacing.

8 Claims, 3 Drawing Sheets

VIDEO DISPLAY APPARATUS FOR DISPLAYING PLURAL IMAGES SIMULTANEOUSLY ON A SCREEN

BACKGROUND OF THE INVENTION

1. Field of the Invention

The present invention relates to a video display apparatus, and more particularly to a video display apparatus for displaying two or more images simultaneously on a same screen.

2. Related Prior Art

A basic constitution of a video display apparatus for displaying two images simultaneously on one screen and its problems are disclosed in Japanese Laid-open Patent Publication 3-18183. In a video display apparatus for displaying a first image and a second image simultaneously, there is a phase difference between a synchronizing signal of video signal of the first image and a synchronizing signal of video signal of the second image, and generally the video signal of the second image is temporarily stored in a field memory. At this time, to display the first image and second image simultaneously, the interlace conditions of these two signals must be matched. That is, when an even-number field is displayed in the first image, an even-number field must be also displayed in the second image. If the interlace conditions of these two signals are not matched, interlace trouble such as line flicker appears. To solve the interlace trouble, the following method is proposed in Japanese Patent Publication 59-37913. This is done in the following steps. First, both fields of video signal of the first image and video signal of the second image are judged, the video signal of the second image is written into the field memory. Then, on the basis of the field judging result of the video signal of the first image, the stored video signal of the second image is read out from an appropriate start phase. In this step, the first image and second image is matched in interlacing.

In this case, however, the input video signal of the first image and the input video signal of the second image are generally different in the signal source, and the frequencies of the synchronizing signals of theses video signals may be slightly different. For example, if the frequency of the synchronizing signal of the video signal of the second image written in the field memory is larger than the frequency of the synchronizing signal of the video signal of the first image used when reading out the above signal from the field memory, the information in the field memory is replaced by the information of next field while reading out the video signal of the second image from the field memory. Accordingly, information of different fields above and below is displayed on the screen for displaying the second image, that is, a boundary problem occurs. In the proposal in Japanese Patent Publication 59-37913, the problem is avoided by displaying one previous image in the event of boundary problem, but the image is stopped in this field.

Incidentally, according to Japanese Laid-open Patent Publication 3-18183, by writing the video signal for the second image into the field memory in a form of non-interlaced signal, it is intended to correct disturbance of image if there is an error in synchronization of the second image or if there is only one type of field, by reading out according to the state of the first video signal. In this case, however, since the second image is created by decimating scanning lines from one frame, it does not matter much when the second image is a small size, but deterioration of picture quality may occur if the first image and second image is similar in size on the display.

To solve the boundary problem, the following method is proposed in Japanese Laid-open Patent Publication 62-269482. This is done in the following steps. First, four field memories are prepared. Concerning the second image, they are divided into field memories for writing two odd-number fields in and field memories for writing two even-number fields in, and an overrun preventive circuit is provided to control to arrest simultaneous writing within each set. Next, judging the field of the video signal for the first image, if the written field memories of odd number or even number coinciding with the result, the field first written in is read out sequentially. As a result, concerning the second image, a row of video signals free from overrun is obtained. In this method, however, the image is disturbed in the case of video signal of non-standard type having only odd-number fields, for example, in some of game machines. That is, the video signal of second image is absent in every other field, and the image is disturbed. Or, in the case of the video signal of the first image being a non-standard signal having only odd-number fields, and the video signal of the second image being a non-standard signal having only even-number fields, this image is not displayed at all. Further, in the case of the video signal of the first image being a standard signal, and the video signal of the second image being a signal of either one field of odd number or even number, if the vertical synchronizing signal of the video signal of the second image is shorter than the vertical synchronizing signal of the first image, the video signals can be stored substantially in only two field memories as for the signals of one field, and therefore when the first and second video signals are entered at the timing of a certain condition, the overrun preventive circuit does not operate, and the boundary problem occurs. Still more, in the case of the video signal of the first image being a standard signal, when the standard signal is changed over to the signal of even-number field only, for example, in the video signal of the second image, the preceding signal is left over in the odd-number field, and this old image remains on display, which is a problem of residual image.

SUMMARY OF THE INVENTION

Object of the Invention

It is hence an object of the invention to present a video display apparatus free from disturbance of picture due to boundary problem if a first image and second and subsequent images are displayed simultaneously, even if the frame frequency of the first image is smaller than twice the frame frequency of the second and subsequent images, or the video signals of the first and second and subsequent images are standard signals composed of odd-number and even-number fields or are composed of either odd-number fields or even-number fields only.

Means of Solving the Problems

To solve the above problems, the invention presents a video display apparatus, being a video display apparatus for displaying plural images simultaneously, which comprises means for converting a video signal of a first image into a component signal if an input signal is a composite signal, means for separating vertical and horizontal synchronizing signals from the first video signal, first field judging means for receiving signals from the vertical and horizontal synchronizing signal separation means of the first video signal and judging the field of the first input signal, a circuit for converting the second and subsequent video signals into component signals when the input signal is a composite signal and further converting into digital signals, means for separating vertical and horizontal synchronizing signals from these second and subsequent video signals, a field memory for storing such video signals, second and subsequent field judging means for receiving the signals from the vertical and horizontal synchronizing signal separation means of the second and subsequent video signals and judging the field of the second and subsequent input signals, writing counters for counting the vertical synchronizing signals from the vertical and horizontal synchronizing signal separation means of the second and subsequent video signals, field judgement writing means for writing the judging result by the second and subsequent field judging means for judging the field of the second and subsequent input signals into a field judging flag corresponding to the signals from these writing counters, component signal writing means for writing the digitally converted component signal into a field memory corresponding to the signals from these writing counters, read selecting means for reading the component signals out of the field memories depending on the content of the field judging flag and judgement of the first field judging means, means for converting the component signals being read out from these field memories by the read selecting means into analog signals, video synthesizing means for synthesizing these analog component signals and first component signal, and means for displaying the synthesized video signals.

According to the invention, even in video signals of a simplified apparatus issuing video signals of one type of field only, such as some of game machines, the writing side timing about the field memory will not overrun the reading side, and the image is stable without picture disturbance. If the first image is composed of signals of odd-number fields only, and one of other images is composed of signals of even-number fields only, the signals of the even-number fields can be converted as signals of odd-number fields, and the image can be displayed.

The invention also presents a display apparatus, being a video display apparatus, which comprises means for converting an input video signal having plural image components into a component signal if the input signal is a composite signal, means for converting the component signal into a digital signal, means for separating vertical and horizontal synchronizing signals from the input signal, field memories for storing these video signals, means for converting the component signals being read out by a read selecting means from these field memories into analog signals, video synthesizing means for synthesizing these analog component signals, and means for displaying the synthesized video signal, further comprising means for receiving the signals from the synchronizing signal separation means and judging the field of the component signals, a counter for counting the number of vertical synchronizing signals separated by the synchronizing signal separation means, field judgement writing means for writing the judging result of the field judging means into the field judgement flag specified by the writing counter, component signal write selecting means for writing the digitally converted component signals into the field memory specified by the writing counter, and read selecting means for reading out the field memory from the content of the field judgement flag and simultaneously issuing plural output component signals, whereby these plural component signals are synthesized and displayed simultaneously.

According to the invention, by feeding a series of information in every field at specific intervals within a same signal, a plurality of images are sent in one channel, and they can be displayed on a same screen.

PREFERRED EMBODIMENT (Embodiment 1)

Figure 1:
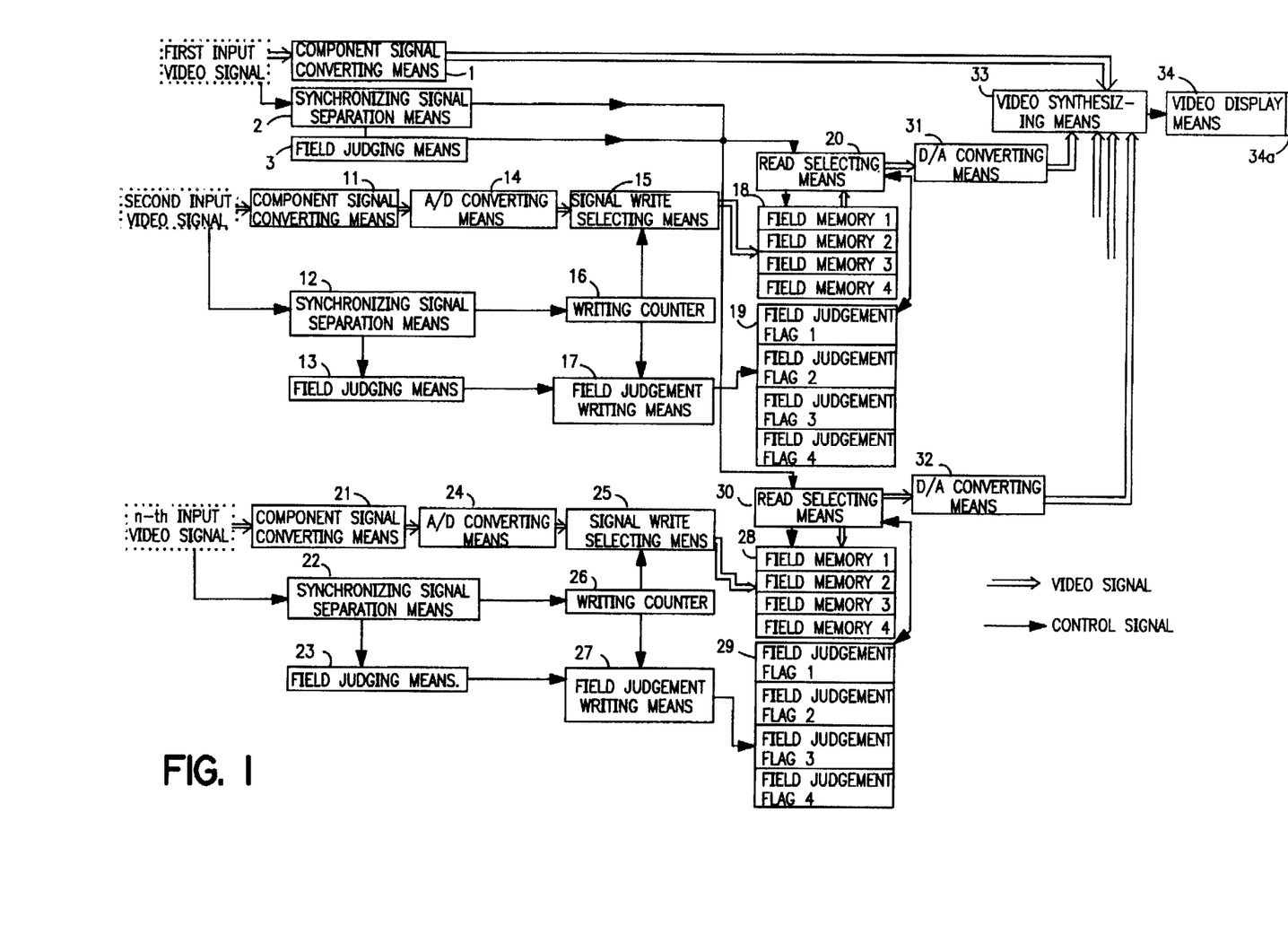
FIG. 1 is a block diagram of embodiment 1.

FIG. 1 is a structural diagram of principal parts of a video display apparatus in an embodiment of the invention. This video display apparatus can receive mutually independent n video inputs, in which reference numerals 1, 11, and 21 are means for converting respectively first, second, and n-th composite input signals into component signals such as R, G, B, or Y, U, V, 2, 12, and 22 are synchronizing signal separation means for corresponding input signals, 3, 13, and 23 are means for judging to which field the individual signals belong, 14 and 24 are A/D converting means for converting the second and n-th component signals into digital signals, signal write selecting means 15 and 25 are means for selecting to write these digital signals in which position if four field memories of 18 and 28 by signals from write counters 16 and 26, and 17 and 27 are field judgement writing means to decide to set up which one of four field judgement flags of 19 and 29 depending on the signals from the field judging means 13 and 23 and the signal from the write counter. Reference numerals 20 and 30 are read selecting means for deciding to read out from which portion of the field memories 18 and 28 depending on the signal from the first input signal field judging means 3 and the position of the field judgement flag.

Reference numerals 31 and 32 are D/A converting means for converting the digital signals being read out into analog signals, 33 is means for synthesizing these converted signals and first component signal, and 34 is means for displaying the synthesized signal.

Referring to FIG. 1, the operation of the video display apparatus of the invention is described below. In FIG. 1, mutually independent video signals, first to n-th, are fed into the video display apparatus. Concerning the first input video signal, the vertical and horizontal synchronizing signals are separated by the synchronizing signal separation means 2, and by the phase difference of the vertical and horizontal synchronizing signals, whether even-number field or odd-number field is judged by the field judging means 3. Depending on the judging result, the read selecting means 20 and 30,and omitted (from FIG. 1) read selecting means for other inputs determine the position in the field memories 18 and 28 and omitted field memories to be read out. On the other hand, concerning the first video signal, after being converted into a component signal by the component signal converting means, the analog signal is directly fed into the video synthesizing means 33, and is synthesized with the outputs of the D/A converting means 31 and 32, and omitted D/A converting means for other inputs. As for the second to n-th input video signals, same as in the case of the first signal, vertical and horizontal synchronizing signals are separated by the synchronizing signal separation means 12 and 22, and omitted synchronizing signal separation means for other inputs, and by the phase difference of the vertical and horizontal synchronizing signals, whether even-number field or odd-number field is judged by the field judging means 13 and 23 and omitted field judging means for other inputs. The results are recorded in the field judgement flags 19 and 29, and omitted field judgment flags for other inputs specified by the write counters 16 and 26, and omitted write counters for other inputs. These write counters instruct the field numbers in each corresponding field memory, when recording digitized signals in the field memories, to the signal write selecting means 15 and 25 and omitted signal write selecting means for other inputs, and field judgement writing means 17 and 27 and omitted field judgement writing means for other inputs. In this method, regarding the four divisions in each field memory as ring buffers, the field numbers are specified in the sequence of 1, 2, 3, 4, 1, 2, 3, 4, 1, and so forth. The digitized signals are the second and subsequent input signals being converted into component signals by component signal converting means 11 and 21 and those omitted for other signals, and further converted into digital signals by the A/D converting means.

The digital video signals written into the field memories 18 and 28 and omitted field memories for other signals are read out by the read selecting means 20 and 30 and omitted read selecting means for other signals, in synchronization with the synchronizing signal of the first video signal.

In these methods, one or two divisions before in the field memory written into each field memory by the video signal write selecting means operating at this time, it is intended to read out the field matching in the content of each field judgement flag, or one field before if any flag content is not matched. For example, when the second signal is a standard signal and the video signal write selecting means 15 is writing an odd-number field into the third field memory 3 of the first memory 18, when the judging result of the first signal is an odd-number field, the signal of two field memories before 18, that is, the signal of the field memory 1 is read out. Or, when the second signal is a signal of even-number fields only, and the first signal is a standard signal with odd-number field, although there is no odd-number field in this field memory, the signal of one field memory before, that is, field memory 2 is read out. In this case, correction of phase difference of interlacing is required in the D/A converting means 31 or video synthesizing means 33.

The signals being readout from these field memories are D/A converted in the D/A converting means 31 and 32 and omitted D/A converting means for other signals, and are put into the video synthesizing means 33. The signal synthesized in the video synthesizing means is displayed as one image in the video display means.

Figure 2:
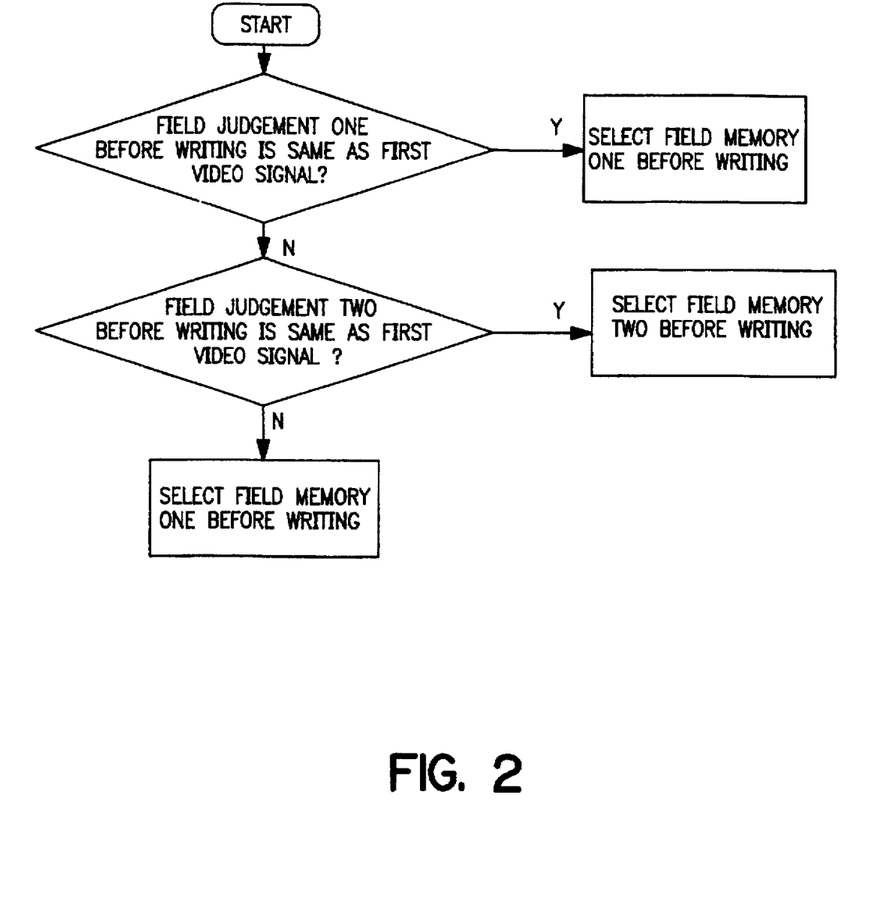
FIG. 2 is a flowchart of read selecting means in embodiment 1.

FIG. 2 shows the operation of the read selecting means of the invention. First referring to the field judgement flag corresponding to one before the field memory being written in at the present, when it is same as the field judging result of the first signal, this field is read, and if different, referring to the field judgement flag corresponding to one field before, that is, two fields before the field presently written in, when it is same as the field judgement flag of the first signal, this field is read. When the field of the first signal does not coincide with either of these two fields, one field before the field being written in at the present is read. The operation in FIG. 2 is same for all of the read selecting means 20 and 30 in FIG. 1 and omitted read selecting means for other signals.

As far as being read in this method, reading of the field being written in does not occur unless the writing speed reaches twice the reading speed, and hence the boundary problem by overrunning phenomenon does not occur in this range. If the second and subsequent signals have only one type of field, signals enter all fields, and overrunning phenomenon does not occur also in the range of the same writing and reading speed.

Thus, according to the first embodiment, if some (or all) of the second and subsequent signals have only one type of field, as in the case of some of game machines and video CD machine, as far as the speed ratio of writing and reading is less than two times as described above, a stable image without overrunning phenomenon is obtained, and residual image problem of picture does not occur.

(Embodiment 2)

Figure 3:
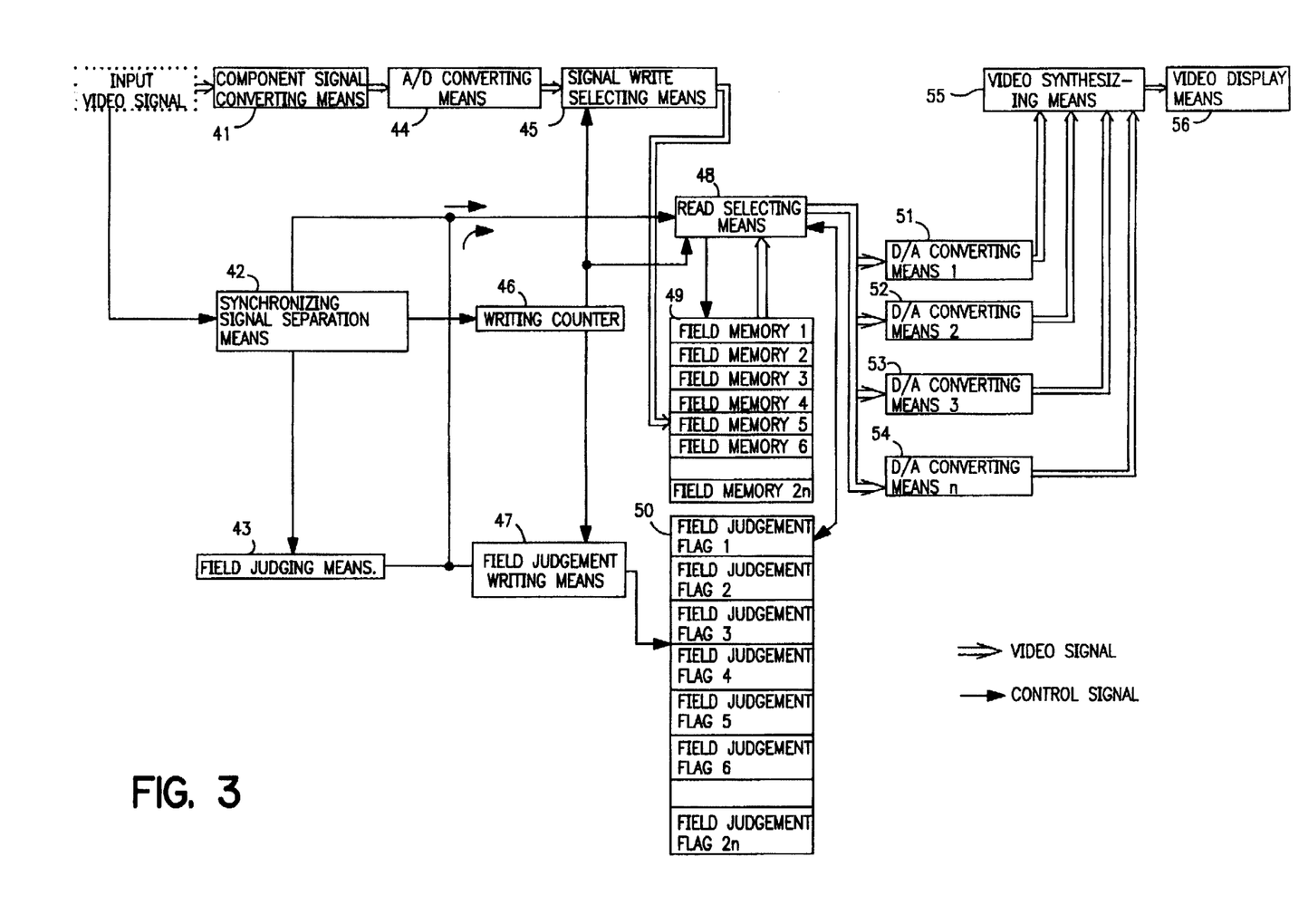
FIG. 3 is a block diagram of embodiment 2.

FIG. 3 is a diagram showing a constitution of a video display apparatus in other embodiment of the invention. In FIG. 3, for the video input signal having plural (n in this case) video contents, reference numeral 41 is means for converting the video signals into component signals, 42 is means for separating vertical and horizontal synchronizing signals from the video signal, 43 is means for judging whether the present input signal is an even-number field or an odd-number field from the phase difference of vertical and horizontal synchronizing signals, 44 is A/D converting means for converting component signals into digital signals, 45 is write selecting means for deciding to write the video signal digitized according to the numerical value of a write counter 46 into which position in a field memory 49, and 47 is field judgement writing means for controlling a field judgement flag 50 depending on the result of field judging means 43 and the numerical value of the write counter 46. Reference numeral 48 is read selecting means for deciding to read which field and putting into D/A converters 51, 52, 53, 54, and omitted (from FIG. 3) for other fields, depending on the judging result (output of 43) of the present input signal and the information of field judgement flag. Reference numeral 55 is video synthesizing means for synthesizing the outputs from these D/A converters to make into one picture, and 56 is display means of the image.

Referring to FIG. 3, the content of the invention is described. The input signal is composed of n components, and input signals of odd numbers are assigned in odd-number fields, and input signals of even numbers in even-number fields, and field memories and field judgement flags are prepared by 2n pieces each. When writing a digitized component signal into the field memory 49, the write counter regards 2n divisions in the field memory 49 as ring buffers, and instructs the field numbers sequentially. The field judgement writing means writes an odd-number field or even-number field in the position corresponding to the field memory number of the field judgement flag 50 according to the field judging result of the field judging means 43 and the instruction of the write counter. When reading out, if the field memory presently being written in is an a-th (1=<a<= 2n), by referring to the field judgment flag of a-1 or a-2, if number a-1 is an odd-number field, the signal of number a-1 is read out as odd-number field in the D/A converting means of number a/2 in the D/A converting devices represented by 51 to 54 in FIG. 3, and when the field a-2 is an odd number, it is read out as an odd-number field in the D/A converting means of number (a-1)/2, and respectively the contents in the field memory a-2 and the field memory a-3 are read out as even-number fields in the D/A converting means of number (a-1)/2 and the D/A converting means of number (a-2)/2. Being thus read out, n signals are processed by the video synthesizing device 55, and different images can be displayed simultaneously in every n fields (if n is odd, n+1 fields) on a screen.

In this apparatus, if there are two image components, by putting a signal for the left eye and a signal for the right eye, respectively, and displaying the signal for the left eye in the leftside of the screen, and the signal for the right eye in the right side of the screen, a three-dimensional image can be transmitted and received.

As its means, by placing a polarizing filter before each image, using polarized glasses or the like, the left side of the screen can be easily seen by the left eye, and the right side of the screen by the right eye.

Moreover, by displaying the right and left images in the even-number field and odd-number field, the same effect is obtained by using a polarizer for changing over the polarity of polarization in every field.

Thus, according to the invention comprising field memories for storing images of plural fields, field judging means for judging even-number field or odd-number field, field judgement flags for storing the field judging results, and field synchronizing device for selecting the field memory to be displayed depending on the flag contents and field judging results, it presents a video display apparatus for displaying plural images without disturbance of image and at high definition of images.

What is claimed is:

1. A video display apparatus for displaying plural images on a screen simultaneously, comprising:

means for converting an input video signal of a first image into a first component signal if the input video signal is a composite signal, separation means for separating vertical and horizontal synchronizing signals from the input video signal, the input video signal having a field type, first field type judging means for receiving signals from the separation means for the input video signal and for judging the field type of the input video signal, a circuit for converting a plurality of subsequent video signals into component signals when the subsequent video signals are composite signals and further converting said plurality of subsequent video signals into digital signals, means for separating vertical and horizontal synchronizing signals from the plurality of subsequent video signals, field memory for storing the digital signals, subsequent field type judging means for receiving the signals from the vertical and horizontal synchronizing signal separation means for the subsequent video signals and judging the field type of the plurality of subsequent video signals to provide a field judging flag, writing counters for generating counting values corresponding to the vertical synchronizing signals from the separation means for the plurality of subsequent video signals, means for storing each field judging flag and for storing each of the respective component signals into said field memory responsive to the counting values from said writing counters, and retrieval and display means for retrieving and displaying the component signals from said field memory responsive to the counting values from said writing counters and the first field type judging means.

2. A video display apparatus comprising:

means for converting an input video signal having a plurality of image components into a component signal if the input video signal is a composite signal, said input video signal having a field type, means for converting the component signal into a digital component signal, separation means for separating vertical and horizontal synchronizing signals from the input video signal, means for receiving the vertical and horizontal synchronizing signals and for judging the field type of the input video signal to produce a field judging flag, a counter for generating a counter value corresponding to the number of vertical synchronizing signals separated by the separation means, field memories for storing said digital component signal, means for storing the field judging flag and for storing the digital component signal into said field memories based on the counter value, and means for retrieving and displaying the digital component signal from said field memories responsive to the field judging flag and a signal from the field type judging means.

3. Apparatus according to claim 2, wherein the component signal further comprises a right and left eye signal component of a three-dimensional image, whereby the three-dimensional image is displayed by displaying the right and left eye signal component in the right and left sides of the screen of the display apparatus respectively.

4. Apparatus according to claim 1, wherein the storing means further comprises:

field judgment writing means for writing the judging result from each of the subsequent field type judging means into a respective field judgment flag corresponding to the signals from said writing counters, and;

component signal writing means for writing the digital signals into the field memory corresponding to the signals from said writing counters.

5. Apparatus according to claim 4, wherein the retrieval and display means further comprises:

read selecting means for reading the component signals from the field memory responsive to the field judging flag and judgment of the first field judging means;

means for converting the component signals read from said field memory by the read selecting means into analog component signals;

video synthesizing means for combining said analog component signals and the first component signal into combined video signals, and;

means for displaying said combined video signals.

6. Apparatus according to claim 2, wherein the storing means further comprises:

field type judgment writing means for writing the judging result of the field type judging means into a field judgment flag specified by the counter, and;

component signal write selecting means for writing the digital component signal into one of the field memories responsive to the counter.

7. Apparatus according to claim 6, wherein the retrieval and display means further comprises:

read selecting means for reading from said field memories at least one of the digital component signals responsive to the contents of the field judgment flag, means for converting said digital component signals being read out by said read selecting means from said field memories into analog component signals;

video combining means for combining said analog component signals to generate a combined video signal, and;

means for displaying the combined video signal.

8. A video display apparatus of claim 7, wherein a polarizing panel is installed at the front panel of the display means.

* * * * *

UNITED STATES PATENT AND TRADEMARK OFFICE
CERTIFICATE OF CORRECTION

PATENT NO. : 5,801,788

DATED : September 1, 1998

INVENTOR(S) : Ashida, et al.

Page 1 of 2

It is certified that error appears in the above-identified patent and that said Letters Patent is hereby corrected as shown below:

On the title page, insert following: item [56] for reference:

U. S. PATENT DOCUMENTS

| EXAMINER INITIAL | | PATENT NUMBER | | | | | | ISSUE DATE | PATENTEE | CLASS | SUBCLASS | FILING DATE IF APPROPRIATE |
|---|---|---|---|---|---|---|---|---|---|---|---|---|
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |
| | | | | | | | | | | | | |

FOREIGN PATENT OR PUBLISHED FOREIGN PATENT APPLICATION

| | | DOCUMENT NUMBER | | | | | | PUBLICATION DATE | COUNTRY OR PATENT OFFICE | CLASS | SUBCLASS | TRANSLATION | |
|---|---|---|---|---|---|---|---|---|---|---|---|---|---|
| | | | | | | | | | | | | YES | NO |
| | | 0 | 4 | 1 | 1 | 5 | 4 | 6 | 02/06/1991 | EPO | | | |
| | | 0 | 5 | 8 | 4 | 6 | 9 | 3 | 03/2/1994 | EPO | | | |
| | | 0 | 3 | 0 | 4 | 2 | 3 | 6 | 2/22/1989 | EPO | | | |
| | | 0 | 4 | 0 | 3 | 2 | 9 | 7 | 12/19/1990 | EPO | | | |
| | | 0 | 2 | 4 | 5 | 7 | 4 | 5 | 11/19/1987 | EPO | | | |

UNITED STATES PATENT AND TRADEMARK OFFICE
CERTIFICATE OF CORRECTION

PATENT NO. : 5,801,788
DATED : September 1, 1998
INVENTOR(S) : Ashida, et al.

It is certified that error appears in the above-identified patent and that said Letters Patent is hereby corrected as shown below:

OTHER DOCUMENTS
(Including Author, Title, Date, Pertinent Pages, Etc.)

European Search Report corresponding to application no. 96306483 dated 3/3/98.

Signed and Sealed this

Eleventh Day of May, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,801,788
DATED : September 1, 1998
INVENTOR(S) : Ashida et al.

It is certified that error appears in the above-identified patent and that said Letters Patent is hereby corrected as shown below:

At column 8, claim 8, "7" should read --2--.

Signed and Sealed this

Eighteenth Day of April, 2000

Attest:

Q. TODD DICKINSON

*Attesting Officer*    *Director of Patents and Trademarks*